Patented Apr. 29, 1924.

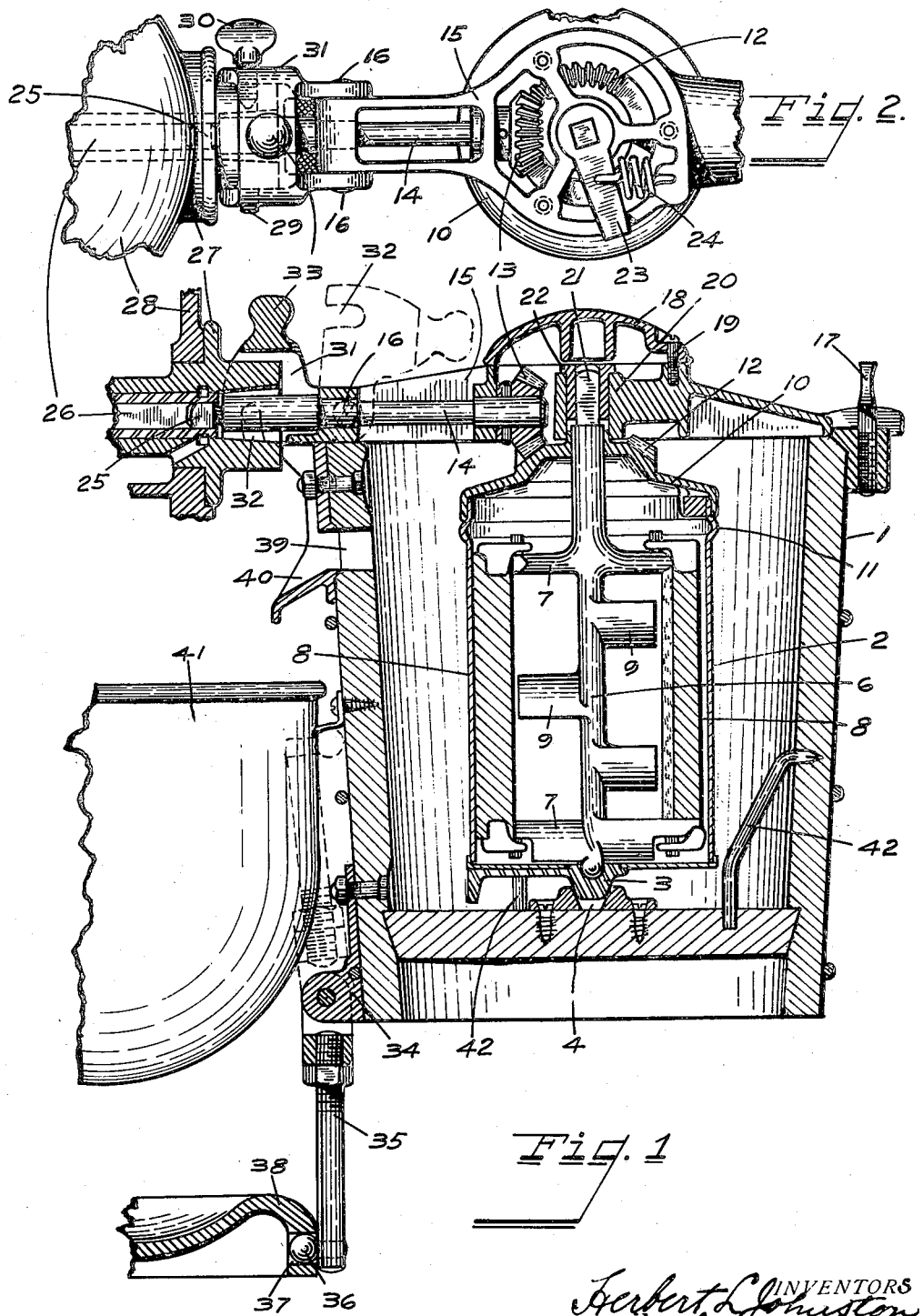

1,492,468

UNITED STATES PATENT OFFICE.

HERBERT L. JOHNSTON AND MILTON K. AKERS, OF TROY, OHIO, ASSIGNORS TO THE HOBART MANUFACTURING COMPANY, OF TROY, OHIO, A CORPORATION OF OHIO.

ICE-CREAM FREEZER.

Application filed February 21, 1922. Serial No. 538,335.

*To all whom it may concern:*

Be it known that we, HERBERT L. JOHNSTON and MILTON K. AKERS, citizens of the United States, and residents of Troy, in the county of Miami and State of Ohio, have invented certain new and useful Improvements in Ice-Cream Freezers, of which the following is a full, clear, and exact description, reference being had to the accompanying drawings, forming part of this specification.

The object of our invention is to supply a household freezer for the freezing of ice cream, custards, and the like, which can be readily and easily attached to a power, preferably electrically driven mixing machine, so that the freezer mechanism can be conveniently driven by power.

Other improvements relate to means provided for properly centering the beater in the can and to mechanism provided for indicating the progressive stiffening and hardening of the material as it is frozen, without opening up the can.

These features of novelty and other improvements in structure and operation will be hereinafter particularly pointed out and claimed.

In the drawings,

Figure 1 is a central vertical section of the improved freezer construction.

Figure 2 is a top plan view with the cap over the driving gears removed.

We have illustrated our improvements in connection with a type of ice cream freezer in which the can for holding the cream is rotated and the beater held stationary. It will be understood, however, that many of the improvements are equally applicable to ice cream freezer constructions in which the beater is rotated and the can held stationary.

The ordinary bucket, preferably made of wood, is indicated by 1. 2 is the can, usually made of sheet metal and provided with a central cone-shaped bearing 3 at the bottom of the can, adapted to fit in the recessed bearing 4 in the bottom of the bucket or ice jacket. 6 is the beater shaft provided with arms 7, 7, at top and bottom, with scrapers 8, 8 preferably of wood, to hug the sides of the can. The beater is also provided with horizontal wings 9, 9, for stirring purposes.

The can is provided with a top 10 which rests on the annular bead 11 and this lid or top has cast integral therewith the beveled gear 12, which meshes with the beveled pinion 13 on the shaft 14. This shaft has its bearing in the yoke 15, which is secured across the top of the ice bucket 1, pivoted at one side by short studs 16 and clamped at the other side by the thumb nut 17. This yoke is provided with a cover 18, to cover the gearing, secured in place by the screw 19.

The yoke carries a central hub 20, into which the upper end of the beater shaft projects. The upper end of this shaft is squared at 21, and fitted over this squared portion in a squared socket therein is a flanged sleeve 22. This sleeve carries an arm 23, which is secured by the coiled spring 24 to a convenient portion of the yoke.

This device, therefore, normally holds the beater in stationary position but adapted to rotate a short distance under the tension of the spring 24.

The shaft 14 projects outwardly and carries at its outer end a squared portion 25 which is adapted to fit in a squared recess in a driving sleeve 26, which is mounted in a flanged hub 27, which extends outwardly from a framework 28 of any suitable mixing machine or any other power driven machine from which it is desired to derive power for rotating the shaft 14, and thus rotating the can 2 through the gears 12 and 13.

In order to conveniently mount the freezer on such a machine, the hub 27 is provided with a pin 29 projecting from one side and the thumb screw 30 from the other.

Pivoted preferably on the pivot pins 16, is a latch 31 provided with slots 32 to form a hook and a head 33 for operating the latch.

At the bottom of the bucket is secured a casting 34 in which is pivoted an adjustable rod 35 which carries at its lower end a projecting piece 36 adapted to engage in a suitable socket or opening 37 provided for the purpose in the base 38 of the machine.

The freezer is hooked by the latch 31 on the pins 29 and 30, and when in this position the driving shaft 14 of the freezer will be coupled, as above described, to the driving sleeve of the machine, and the leg or support 35 is adjusted of the proper length with the projection 36 engaging the socket in the base of the machine. In this way the bucket is held in proper position and is prevented from revolving or changing its position during the freezing of the material.

Inasmuch as the supporting leg 35 is pivoted when it is desired to remove the freezer and operate it manually by the usual hand crank fitted to the end of the shaft 14, the leg can be turned up out of the way into the position shown in the dotted lines in Figure 1.

The bucket 1 is provided with an aperture 39 on the driving side, which aperture is furnished with a chute 40, so as to direct the overflow of water from the melting ice into the bowl 41 of the mixing machine.

In order to enable the operator to properly center the can 2 in the freezer bucket, we provide a plurality of properly bent rods 42 around the sides of the bucket at the bottom.

In view of the construction which has been heretofore described, by means of which the heater is secured by the coiled spring 24 to the fixed yoke, it will be obvious that under light tension at the commencement of the operation the beater will be held in fixed position as the can is rotated, but that as the material in the freezing can hardens, the beater will be subject to increasing torsional strains and the spring 24 will elongate, allowing the arm 21 to turn. In this way, the operator can determine the hardness of the mixture, and when the same becomes sufficiently hardened, this will be clearly indicated.

In order to guide the freezer shaft readily into the squared opening in the driving sleeve of the machine, the outer end of this driving shaft is made somewhat conical, and for the same reason the hub in which the machine driving sleeve is mounted is formed with a slightly conical recess.

Having thus described our invention, what we claim as new and desire to secure by Letters Patent, is:—

1. In an ice cream freezer, the combination with the frame, of a can and a beater, one part rotatable and the other relatively fixed, a yielding connection for the relatively fixed member with the frame, whereby the said member may shift under the rotation of the rotatable member, and an indicator to indicate the amount of resistance imparted to the rotatable member as the material congeals.

2. In an ice cream freezer, the combination with the frame, of a can and a beater, one part rotatable and the other relatively fixed, a coiled spring connecting the relatively fixed member with the frame, whereby the said member may shift under the rotation of the rotatable member, and means to indicate the resistance imparted to the rotatable member as the material congeals.

3. In an ice cream freezer, the combination with the frame, of a can to hold the material to be frozen, means for rotating the can, a beater mounted on the can and means for resiliently securing the beater to the frame with an indicating device to indicate the amount of movement of the beater as the material in the can congeals.

4. In an ice cream freezer, the combination with the frame, of a can to hold the material to be frozen, means for rotating the can, a beater mounted in the can and a coiled spring for securing the beater to the frame with an indicating device to indicate the amount of movement of the beater as the material in the can congeals.

5. In an ice cream freezer, the combination with the frame, of a can and gearing for rotating the same, a beater in the can, a coupling member secured to the beater, adapted to rotate in the frame, and resilient means to secure the coupling member to the frame to permit movement of the beater as the material in the can congeals.

6. In an ice cream freezer, the combination with the frame, of a can and gearing for rotating the same, a beater in the can, a coupling member secured to the beater, adapted to rotate in the frame, an arm on the coupling member and a spring for securing the arm to the frame to permit movement of the beater and to indicate the extent the material has congealed.

7. In an ice cream freezer, means for supporting the freezer upon a power driven machine, comprising a latch pivoted to the bucket near its upper edge and a leg or support for the bucket pivoted at its lower edge, a driving member on the power driven machine, a driving shaft for the freezer, and means coupling the freezer shaft to the driving member in alignment with the latch support.

8. In an ice cream freezer, means for supporting the freezer upon a power driven machine, comprising a latch pivoted to the bucket near its upper edge and a leg or support for the bucket pivoted at its lower edge, a driving member on the power driven machine, a hub in which the driving member is journaled with pins projecting laterally from the hub for engagement by the latch, a driving shaft for the freezer, and means coupling the freezer shaft to the driving member in alignment with the latch support.

9. In an ice cream freezer, means for supporting the freezer upon a power driven machine, comprising a latch pivoted to the bucket near its upper edge and a leg or support for the bucket pivoted at its lower edge, a driving member on the power driven machine, a driving shaft for the freezer, and means coupling the freezer shaft to the driving member in alignment with the latch support, the freezer bucket provided with an opening below the latch support, and a chute for directing the salt water from the bucket and a bowl on the power driven machine to receive the same.

HERBERT L. JOHNSTON.
MILTON K. AKERS.